United States Patent
Bridgwater et al.

(10) Patent No.: US 8,291,250 B2
(45) Date of Patent: *Oct. 16, 2012

(54) MANAGEMENT OF POWER STATES IN A PORTABLE COMPUTING DEVICE

(75) Inventors: Thomas Bridgwater, San Francisco, CA (US); William Rees, Mountain View, CA (US); Paul Cousineau, Burlingame, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 284 days.

This patent is subject to a terminal disclaimer.

(21) Appl. No.: 12/819,358

(22) Filed: Jun. 21, 2010

(65) Prior Publication Data

US 2010/0262854 A1     Oct. 14, 2010

Related U.S. Application Data

(63) Continuation of application No. 11/195,464, filed on Aug. 2, 2005, now Pat. No. 7,747,886.

(51) Int. Cl.
    *G06F 1/32* (2006.01)
(52) U.S. Cl. ......................................... 713/323; 713/324
(58) Field of Classification Search .................. 713/323, 713/324

See application file for complete search history.

(56) References Cited

U.S. PATENT DOCUMENTS

| 5,710,929 | A  | 1/1998  | Fung      |
| 6,418,536 | B1 | 7/2002  | Park      |
| 7,096,309 | B2 | 8/2006  | Ginosar   |
| 7,228,443 | B2 | 6/2007  | Nishikawa |
| 7,296,171 | B2 | 11/2007 | Hahn et al. |

*Primary Examiner* — Thuan Du

(57) ABSTRACT

Embodiments of the present invention provide a method and apparatus for managing power states in a personal computing device, while maintaining a perception by the user of "instant on" functionality. In various embodiments of the invention, the power states are presented to the user as a simple on/off option and the power management protocol is not visible within the user interface of the personal computing device thereby providing the user with the impression that the system is operating with a simple binary on/off protocol. In one embodiment of the invention, the personal computing device is operable to transition between a set of power states that include: 1) an "on" power state wherein the display is on and the customer can use all input devices; 2) a "ready" state wherein the display is turned off, but some modules, such as a radio module, remain on; 3) an "off" state wherein the personal computing device turns off after a slight pause, but a "booted kernel" is held in SDRAM; and 4) a "dead" state wherein none of the modules of the personal computing device are powered and the device must be cold booted to restart.

20 Claims, 3 Drawing Sheets

MANAGEMENT OF POWER STATES IN A PORTABLE COMPUTING DEVICE

BACKGROUND OF THE INVENTION

1. Field of the Invention

Embodiments of the present invention relate in general to the field of portable computing devices and, more particularly, to an improved method and apparatus for the management of power states in a portable computing system.

2. Description of the Related Art

In recent years, there has been a rapid expansion of the use of personal computing devices, particularly those adapted for portable use. Personal computing devices include lightweight portable computers, such as handheld computers, "palm-tops", and personal digital assistants (PDAs), that typically weigh one to three pounds. These personal computing devices generally provide some combination of personal information management, database functions, word processing, and spreadsheets as well as voice memo recording, wireless e-mail, and wireless telephony functions.

Since personal computing devices are generally battery powered, it is important to maximize battery life to enhance the usability of such devices. It is also desirable, however, to provide users with rapid access to software applications. Some personal computing devices, such as PDAs, provide "instant on" functionality, but do so by draining the battery during the "off" state. It is possible to simulate "instant on" in laptop computers; however it is still necessary to drain battery power in the "off" state. Prolonged periods of inactivity result in the need to shut the computer off completely, thereby requiring the execution of a full or abbreviated reboot procedure.

As will be understood by those of skill in the art, it is highly desirable to minimize the time needed to place the device in a fully operational state. At the same time, however, it is important to minimize the amount of batter power needed to maintain the device in a state that gives the user the perception that the device is instantly activated. In view of the foregoing, there is a need for a method and apparatus that is capable of providing effective power management for a personal computing device, while minimizing the latency experienced by users.

SUMMARY OF THE INVENTION

Embodiments of the present invention overcome the shortcomings of the prior art by providing a method and apparatus for managing power states in a personal computing device, while maintaining a perception by the user of "instant on" functionality. In the method and apparatus of embodiments of the present invention, power states are presented to the user as a simple on/off option. The implementation of the power management protocol is not visible within the user interface of the personal computing device and provides the user with the impression that the system is operating with a simple binary on/off protocol.

In one embodiment of the invention, the personal computing device is operable to transition between a set of power states that include: 1) an "on" power state wherein the display is on and the customer can use all input devices; 2) a "ready" state wherein the display is turned off, but some system modules, such as a radio module, remain on; 3) an "off" state wherein the personal computing device turns off after a slight pause, but a "booted kernel" is held in SDRAM; and 4) a "dead" state wherein none of the modules of the personal computing device are powered and the device must be cold booted to restart.

When the personal computing device is in the "ready state," it draws some power to maintain "readiness," but is capable of turning on instantly. When the personal computing device enters the "off" state, the operating system kernel remains stored in memory. In this state, all system peripherals are shut down, but the contents of the system memory (including the operating system kernel) remain intact. In this state, the only power draw from the battery is to maintain the contents of the RAM and the system clock, allowing the personal computing system to come to life quickly. When the personal computing device is in the "dead" state, it must be "cold booted: to resume normal functionality, i.e., the system clock will need to be reset and, in some cases, it may need to be charged for a period of time before the device can be restarted.

As will be understood by those of skill in the art, the method and apparatus of embodiments of the present invention is capable of providing effective power management for a personal computing device, while minimizing the latency experienced by users.

BRIEF DESCRIPTION OF THE DRAWINGS

The embodiments of the present invention may be better understood, and its numerous objections, features and advantages made apparent to those skilled in the art by referencing the accompanying drawings of embodiments of the invention. The use of the same reference number throughout the several figures designates a like or similar element.

DETAILED DESCRIPTION

Figure 1:
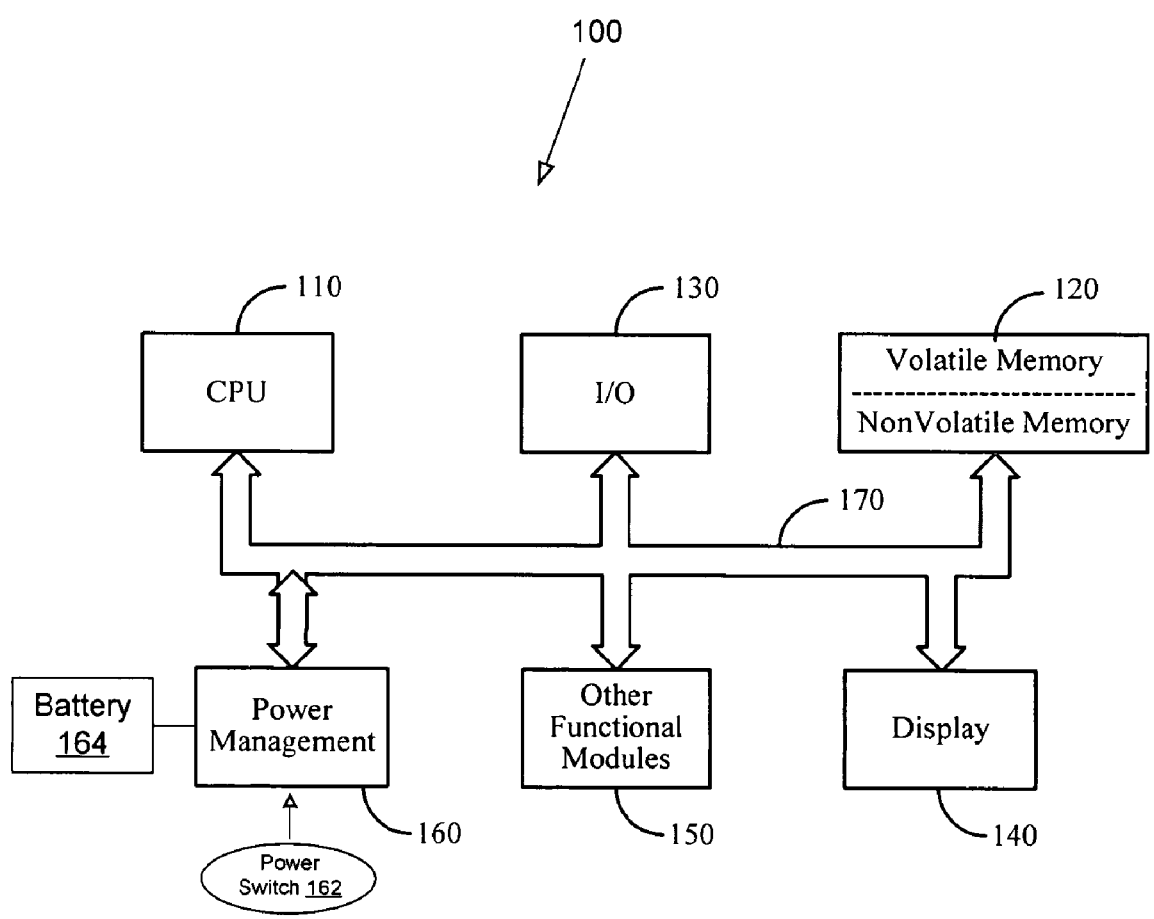
FIG. 1 is a generalized illustration of a computing system, such as a PDA, that can be used to implement the method and apparatus of an embodiment of the present invention.

FIG. 1 is an illustration of major functional components used in a personal computing device 100 or PDA used to implement the method and apparatus of an embodiment of the present invention. Personal computing device 100 includes a processor 110 which may be any of a variety of conventional processing devices. A memory 120 is coupled to processor 110. Memory 120 may be any of a variety of volatile and non-volatile memory devices including, but not limited to, read only memory (ROM), random access memory (RAM), flash memory, etc. Memory 120 may be utilized to store programs running on processor 110, and/or may be used to store other types of information. An input/output (I/O) module 130, which includes a wireless radio interface is coupled to processor 110 to provide for transport of data and control signals into and out of the personal computing device 100. Personal computing device 100 also includes a display 140. Display 140 may be any of a variety of displays including, but not limited to, an LCD touch screen display. Display 140 may be used to display information to a user of personal computing device 100. Other data processing functional modules, illustrated generally by reference number 150, can provide a plurality of data processing functions, such as memory management, graphics processing, and other functions known to those of skill in the art. A power management module 160 is operable to control the power consumption of the various function modules of the personal computing device 100, as discussed in greater detail hereinbelow. As will be understood by those of skill in the art, the processor 110 and the other functional components 150 in the personal computing device 100 can be connected using one or more buses illustrated generally by bus 170 in FIG. 1.

Embodiments of the present invention overcome the previously mentioned shortcomings of the prior art by providing a method and apparatus for managing power states of the personal computing device 100, while maintaining an "instant on" functionality. In an embodiment of the present invention, the personal computing device 100 transitions from an "on" state to a plurality of reduced power states after a predetermined period of inactivity. In another embodiment of the invention, the transition from the "on" state to a plurality of reduced power states is presented to the user as a simple "on/off" option.

The power management module implements a power management protocol that is not visible from the user interface. While the user may notice a slight difference in turn-on time associated with the transition from some power states to the "on" state, the overall operation of the system provides the user with the impression that the system is operating with a simple binary "on/off" protocol.

Figure 2:
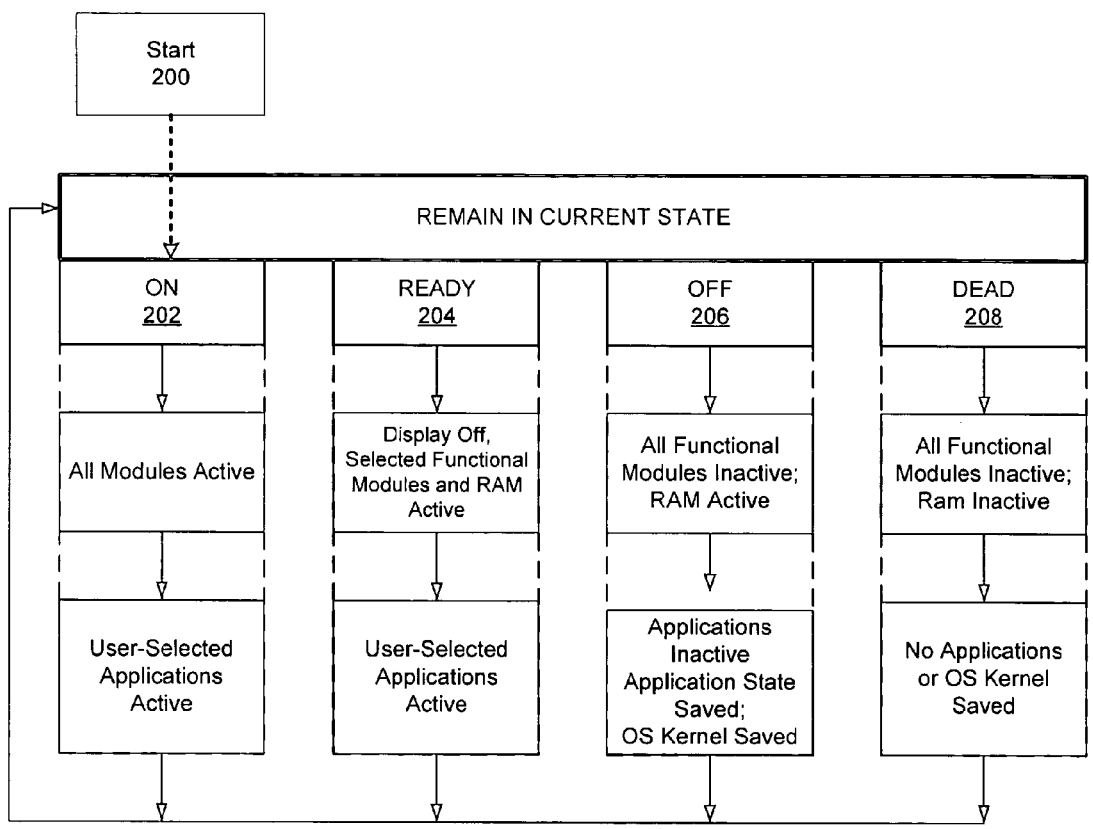
FIG. 2 is a logic diagram illustrating operation of the power management system according to an embodiment of the present invention.

FIG. 2 is a logic diagram illustrating an embodiment of the power management functionality implemented by the power management module 160. The personal computing device is initially powered-up from a cold boot as designated by the "start" state 200. After the initial power up, the power management module 160 provides four power possible states: 1) an "on" power state (designated by reference numeral 202) wherein the display is on and the customer can use all input devices; 2) a "ready" state (designated by reference numeral 204) wherein the display is turned off, but some modules, such as a radio module, remain on; 3) an "off" state (designated by reference numeral 206) wherein the device turns off after a slight pause, but a "booted kernel" is held in SDRAM; and 4) a "dead" state (designated by reference numeral 208) wherein none of the modules of the device are powered and the device must be cold booted to restart.

The state of the applications and system modules for each of the aforementioned operating states is summarized briefly in the transition blocs illustrated in FIG. 2. The "on" state 202 is the normal operating state wherein the user is actively using the personal computing device 100. After a predetermined period of inactivity, the power management module causes the personal computing device to migrate to the "ready" state 204. When the device is in the "ready" state, it draws some power to maintain "readiness," but is capable of turning on instantly. When the device is in the "off" state 206, all applications are shut down first and only the operating system kernel remains in the RAM. Each of the applications saves its state information to non-volatile storage. The operating system then saves the system state with no running applications. In this state, all that remains in RAM is enough code for the system to be able to come back to life quickly. Power drain is limited to an amount needed to maintain the system clock and to keep the RAM powered. When the system is in the "dead" state 208, the system will need to be returned to the "start" state 200 by the user for a cold boot, the system clock will need to be reset and, in some cases, the system may need to be charged for a period of time before the system can be restarted.

Figure 3:
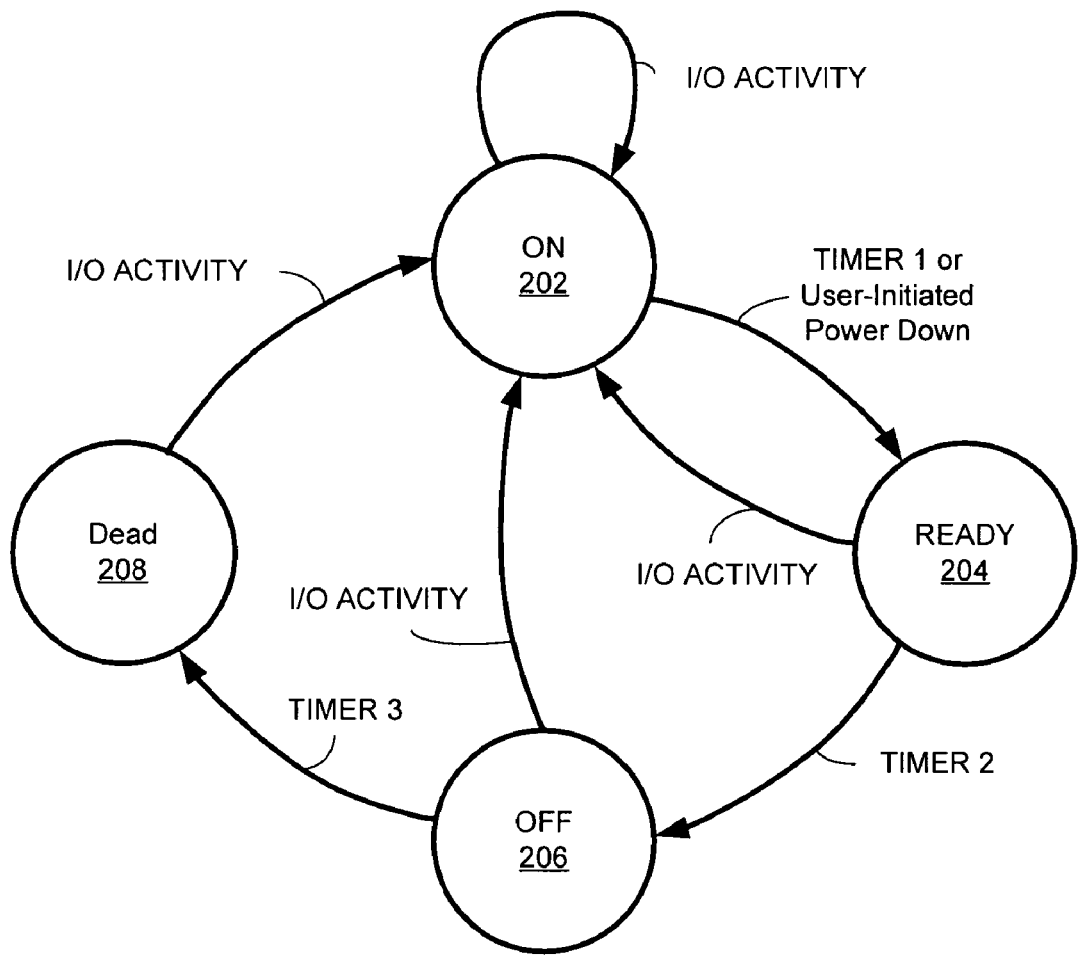
FIG. 3 is a state diagram illustrating operation of the power management system according to an embodiment of the present invention.

The transition of the personal computing device between the various power states is illustrated in the state diagram of FIG. 3. The transition from one state to another state can be based on a detection of a predetermined period of inactivity or on a specified user input. The personal computing device 100 executes first, second, and third timers that are used to measure time intervals for initiating the transition from one power state to another power state. The personal computing device 100 can transition from any power state to the "on" power state upon detection of I/O activity or upon detection of a user input. If the personal computing device 100 is operating in a reduced power state, it can transition to the "on" state if the user presses the power switch 162.

Referring to FIG. 3, the personal computing device 100 can transition from the "on" state 202 to the "ready" state 204 either as a result of a user input or as a result of inactivity for a predetermined period of time. In an embodiment of the present invention, the display 140 of the personal computing device 100 turns off immediately when the user presses the power switch 162 or closes the screen to power-down the system. In this embodiment, the first timer will be truncated and the system will immediately enter the "ready" state 204. The personal computing device will also automatically transition from the "on" state 202 to the "ready" state 204 if it receives no input from the user configurable amount of time, e.g., ten minutes. Any state saving activity continues while the video screen is off. The personal computing device can be returned to the "on" state 202 upon detection of the I/O activity or if the user presses and releases the power switch 162. In an embodiment of the present invention, the video display is illuminated in an extremely short time period, e.g. 100 ms, when transitioning from the "ready" state 204 to the "on" state 202 to give the illusion of instant turn-on. Since the various user-selected applications are maintained in an "active" state, the transition from the "ready" state 204 to the "on" state 206 does not adversely affect any of the applications running on the system.

If the personal computing device 100 is not returned to the "on" state 202 within a predetermined period of time, e.g., 30 minutes, the system transitions from the "ready" state 204 to the "off" state 206. As discussed above, this state allows the system to keep power drain as low as possible, while still keeping the operating system kernel booted. In an embodiment of the present invention, using a battery 164 having a rating of 6800 mAh, the system is capable of staying in the "off" mode 206 for up to four months. Upon detection of I/O activity or upon user input, such as pressing the power switch 162, the system is capable of returning to the "on" state 202 in a very short period of time, i.e., 500 ms, and the combination of the operating system kernel in RAM and the operating state saved to non-volatile memory are used to return the system to the previous state.

If the system is not returned to the "on" state for a very long period of time, i.e. several months, the low level power draw in the "off" state will eventually cause the system to transition to the "dead" state 208. From the "dead" state 208, the system proceeds through the cold boot cycle, just like the first time it was booted at the "start" state 200.

As will be appreciated by those of skill in the art, the method and apparatus of an embodiment of the present invention is capable of providing effective power management for a personal computing device, while minimizing the latency experienced by users. Although embodiments of the present invention have been described in detail, it should be understood that various changes, substitutions and alterations can be made hereto without departing from the spirit and scope of the invention as defined by the appended claims.

What is claimed is:

1. A personal computing device, comprising:
a display;

a plurality of data processing modules; and a processor to execute instructions for transitioning a power consumption of said display and said plurality of data processing modules to one of a plurality of reduced power states and to return the personal computing device to a full active state upon detection of input or output activity, wherein the display is illuminated prior to completing the transition from any of the plurality of reduced power states to the full active state.

2. The personal computing device of claim 1, wherein transitioning the power consumption of said plurality of data processing modules between power states is based on a detection of a predetermined period of inactivity or a user input.

3. The personal computing device of claim 1, wherein transitioning the power consumption of said display and said plurality of data processing modules to one of a plurality of reduced power states is based on a set of predetermined operating parameters.

4. The personal computing device of claim 1, wherein the processor is configured to execute a plurality of timers corresponding to the plurality of reduced power states.

5. The personal computing device of claim 4, wherein the processor is configured to transition the power consumption of the display and the data processing modules to the plurality of reduced power states upon expiration of corresponding timers of said plurality of timers.

6. The personal computing device of claim 5, wherein a first timer of said plurality of timers is truncated by a user input to place said personal computing device in a first reduced power state.

7. The personal computing device of claim 6, wherein when the personal computing device is configured in said first reduced power state the display is in an inactive state, and a volatile storage of said personal computing device is in an active state.

8. The personal computing device of claim 7, wherein said plurality of reduced power states includes a second reduced power state, and wherein upon transition to said second reduced power state, the data processing modules are inactive, the volatile storage is active, and application state information and an operating system kernel are stored in said volatile storage.

9. The personal computing device of claim 8, wherein said plurality of reduced power states includes a third reduced power state, and wherein upon transition to said third reduced power state, said data processing modules are inactive and said volatile storage is in an inactive state.

10. The personal computing device of claim 1, wherein transitioning the power consumption of said plurality of data processing modules between power states is presented to a user as an on/off option.

11. A method for simulating instant on functionality in a personal computing device having a processor, a display and a plurality of data processing modules, the method comprising:

using said processor to execute instructions to:
transition a power consumption of said display and said plurality of data processing modules to one of a plurality of reduced power states; and
return the personal computing device to a full active state upon detection of input or output activity;
wherein the display is illuminated prior to completing the transition from any of the plurality of reduced power states to the full active state.

12. The method of claim 11, comprising transitioning the power consumption of said plurality of data processing modules between power states based on detection of a predetermined period of inactivity or user input.

13. The method of claim 11, comprising transitioning the power consumption of said display and said plurality of data processing modules to one of a plurality of reduced power states based on a set of predetermined operating parameters.

14. The method of claim 11, comprising correlating a plurality of timers with the plurality of reduced power states.

15. The method of claim 14, comprising transitioning the power consumption of the display and the data processing modules to the plurality of reduced power states upon expiration of a respective one of said plurality of timers.

16. The method of claim 14, comprising truncating a first timer of said plurality of timers by user input to place said personal computing device in a first reduced power state.

17. The method of claim 16, wherein when the personal computing device is configured in said first reduced power state the display is in an inactive state, and a volatile storage of said personal computing device is in an active state.

18. The method of claim 17, wherein said plurality of reduced power states includes a second reduced power state, and wherein upon transition to said second reduced power state, the data processing modules are inactive, the volatile storage is active, and application state information and an operating system kernel are stored in said volatile storage.

19. The method of claim 18, wherein said plurality of reduced power states includes a third reduced power state, and wherein upon transition to said third reduced power state, said data processing modules are inactive and said volatile storage is in an inactive state.

20. The method of claim 11, wherein transitioning the power consumption of said plurality of data processing modules between power states is presented to a user as an on/off option.

* * * * *